United States Patent
Kabaria et al.

(10) Patent No.: US 12,173,771 B2
(45) Date of Patent: Dec. 24, 2024

(54) CUSHIONS CONTAINING SHOCK ABSORBING TRIPLY PERIODIC LATTICE AND RELATED METHODS

(71) Applicant: Carbon, Inc., Redwood City, CA (US)

(72) Inventors: Hardik Kabaria, Redwood City, CA (US); Aidan Kurtz, Palomar Park, CA (US); Robert G. Sage, Los Altos, CA (US); Nicholas K. Burgess, San Jose, CA (US); Ruiqi Chen, Novi, MI (US)

(73) Assignee: CARBON, INC., Redwood City, CA (US)

( * ) Notice: Subject to any disclaimer, the term of this patent is extended or adjusted under 35 U.S.C. 154(b) by 289 days.

(21) Appl. No.: 17/630,953

(22) PCT Filed: Sep. 4, 2020

(86) PCT No.: PCT/US2020/049444
§ 371 (c)(1),
(2) Date: Jan. 28, 2022

(87) PCT Pub. No.: WO2021/046376
PCT Pub. Date: Mar. 11, 2021

(65) Prior Publication Data
US 2022/0275845 A1 Sep. 1, 2022

Related U.S. Application Data

(60) Provisional application No. 62/896,781, filed on Sep. 6, 2019.

(51) Int. Cl.
*F16F 7/12* (2006.01)
*B29C 64/106* (2017.01)
(Continued)

(52) U.S. Cl.
CPC ............ *F16F 7/121* (2013.01); *B29C 64/106* (2017.08); *B29C 64/264* (2017.08); *B29C 64/35* (2017.08);
(Continued)

(58) Field of Classification Search
CPC ............... F16F 7/121; F16F 2224/0225; F16F 2226/00; F16F 2234/00; B33Y 10/00;
(Continued)

(56) References Cited

U.S. PATENT DOCUMENTS 5,236,637 A 8/1993 Hull
5,391,072 A 2/1995 Lawton et al.
(Continued)

FOREIGN PATENT DOCUMENTS

EP 3000341 A1 3/2016
WO 2015195924 A1 12/2015
(Continued)

OTHER PUBLICATIONS

International Search Report and Written Opinion for PCT/US2020/049444 mailed Dec. 23, 2020, 13 pages.
(Continued)

*Primary Examiner* — Catherine A. Simone
(74) *Attorney, Agent, or Firm* — Myers Bigel, P.A.

(57) ABSTRACT

An additively manufactured cushion includes an array of interconnected surface lattice unit cells. The surface lattice unit cells are comprised of a unit cell surface portion configured as a Schoen F-RD minimal surface unit cell, and the unit cell surface portion is comprised of a rigid, flexible, or elastic polymer. In some embodiments, the surface lattice unit cells have an average width of from 1 to 100 millimeters and an average volume fraction of from 5 or 10 percent to 50 or 60 percent.

17 Claims, 8 Drawing Sheets

(51) Int. Cl.
  *B29C 64/264* (2017.01)
  *B29C 64/35* (2017.01)
  *B33Y 10/00* (2015.01)
  *B33Y 40/20* (2020.01)
  *B33Y 80/00* (2015.01)

(52) U.S. Cl.
  CPC .............. *B33Y 10/00* (2014.12); *B33Y 40/20* (2020.01); *B33Y 80/00* (2014.12); *F16F 2224/0225* (2013.01); *F16F 2226/00* (2013.01); *F16F 2234/00* (2013.01)

(58) Field of Classification Search
  CPC ....... B33Y 40/20; B33Y 80/00; B29C 64/264; B29C 64/35; B29C 64/106
  See application file for complete search history.

(56) References Cited

U.S. PATENT DOCUMENTS

| | | | |
|---|---|---|---|
| 5,529,473 | A | 6/1996 | Lawton et al. |
| 6,607,562 | B2 | 8/2003 | Ghorashi et al. |
| 7,438,846 | B2 | 10/2008 | John |
| 7,765,622 | B2 | 8/2010 | Wiles |
| 7,892,474 | B2 | 2/2011 | Shkolnik et al. |
| 8,110,135 | B2 | 2/2012 | El-Siblani |
| 8,127,575 | B2 | 3/2012 | Burrow et al. |
| 9,062,913 | B2 | 6/2015 | Araujo et al. |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,392,831 | B2 | 7/2016 | Storelli et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 9,738,013 | B1 | 8/2017 | Yang et al. |
| 9,820,524 | B1 | 11/2017 | Whitcomb |
| 9,839,251 | B2 | 12/2017 | Pannikottu et al. |
| 10,384,394 | B2 | 8/2019 | Mccluskey |
| 10,875,239 | B2 | 12/2020 | Mccluskey |
| 2012/0196100 | A1 | 8/2012 | Boyce et al. |
| 2013/0292862 | A1 | 11/2013 | Joyce |
| 2013/0295212 | A1 | 11/2013 | Chen et al. |
| 2015/0331402 | A1 | 11/2015 | Lin et al. |
| 2015/0360419 | A1 | 12/2015 | Willis et al. |
| 2016/0288376 | A1 | 10/2016 | Sun et al. |
| 2017/0129167 | A1 | 5/2017 | Castanon |
| 2017/0129169 | A1 | 5/2017 | Batchelder et al. |
| 2017/0327066 | A1 | 11/2017 | Lakic |
| 2018/0126630 | A1 | 5/2018 | Panzer et al. |
| 2018/0243976 | A1 | 8/2018 | Feller |
| 2018/0264718 | A1 | 9/2018 | Mccluskey |
| 2018/0290374 | A1 | 10/2018 | Willis et al. |
| 2019/0231018 | A1 | 8/2019 | Boutin |
| 2020/0100554 | A1 | 4/2020 | Bologna et al. |
| 2020/0113267 | A1 | 4/2020 | Light et al. |
| 2020/0154803 | A1 | 5/2020 | Goulet et al. |
| 2020/0215415 | A1 | 7/2020 | Bologna et al. |
| 2021/0024775 | A1 | 1/2021 | Rolland et al. |

FOREIGN PATENT DOCUMENTS

| | | |
|---|---|---|
| WO | 2016007495 A1 | 1/2016 |
| WO | 2016140886 A1 | 9/2016 |
| WO | 2020086370 A1 | 4/2020 |
| WO | 2021046376 A1 | 3/2021 |

OTHER PUBLICATIONS

Al-Ketan, Oraib, et al., "Multifunctional mechanical-metamaterials based on triply periodic minimal surface lattices: A review", Advance Engineering Materials, vol. 21, No. 10, Aug. 20, 2019 (Aug. 20, 2019), 81 pages.

Janusziewicz, Rima, et al., "Layerless fabrication with continuous liquid interface production", PNAS, 113(42), 2016, 11703-11708.

Kapfer, Sebastian, "Morphometry and Physics of Particulate and Porous Media", Doctoral Thesis. Friedrich-Alexander-Universität Erlangen-Nürnberg (FAU), 2011, (222 pages).

Schoen, Alan H., "Infinite periodic minimal surfaces without self-intersections", NASA Technical Note TN D-5541, 1970, (100 pages).

Tumbleston, John R., et al., "Continuous liquid interface production of 3D Objects", Science, 347(6228), 2015, 1349-1352.

Wohlgemuth, Meinhard, "Triply Periodic Bicontinuous Cubic Microdomain Morphologies by Symmetries", Macromolecules, 34(17), 2001, 6083-6089.

CUSHIONS CONTAINING SHOCK ABSORBING TRIPLY PERIODIC LATTICE AND RELATED METHODS

RELATED APPLICATIONS

This application is a 35 U.S.C. § 371 national phase entry of International Application No. PCT/US2020/049444, filed Sep. 4, 2020, which claims priority to provisional application U.S. Application Ser. No. 62/896,781, filed Sep. 6, 2019, the contents of which are incorporated by reference herein in their entirety.

FIELD OF THE INVENTION

The present invention concerns shock absorbing cushions, and in particular, shock absorbing cushions containing triply periodic lattices are related methods.

BACKGROUND

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top-down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678, 9,205,601, and 9,216,546 to DeSimone et al.; and also J. Tumbleston, D. Shirvanyants, N. Ermoshkin et al., Continuous liquid interface production of 3D Objects, Science 347, 1349-1352 (2015); see also Rolland et al., U.S. Pat. Nos. 9,676,963, 9,453,142 and 9,598,606.

In differential geometry, a triply periodic minimal surface (TPMS) is a minimal surface and is invariant under a rank-3 lattice of translations. Numerous examples are known, and in 1970 Alan Schoen came up with 12 new TPMS based on skeleton graphs spanning crystallographic cells. Infinite periodic minimal surfaces without self-intersections were described by Alan Schoen in 1970. See Alan H. Schoen, Infinite periodic minimal surfaces without self-intersections, NASA Technical Note TN D-5541 (1970).

Later studies on infinite periodic minimal surfaces include "Triply Periodic Bicontinuous Cubic Microdomain Morphologies by Symmetries," Wohlgemuth et al. (Macromolecules 2001, 34, 6083-6089), which discusses triply periodic embedded surfaces with cubic symmetries investigated with algorithmic procedures, and Kapfer, "Morphometry and Physics of Particulate and Porous Media," Dissertation, Dec. 16, 2011.

SUMMARY

In some embodiments, an additively manufactured cushion includes an array of interconnected surface lattice unit cells. The surface lattice unit cells are comprised of a unit cell surface portion configured as a Schoen F-RD minimal surface unit cell, and the unit cell surface portion is comprised of a rigid, flexible, or elastic polymer. In some embodiments, the surface lattice unit cells have an average width of from 1 to 100 millimeters and an average volume fraction of from 5 or 10 percent to 50 or 60 percent.

In some embodiments, the cushion comprises a curved portion, and the unit cells in the curved portion are conformal and frame field aligned.

In some embodiments, the unit cell surface portion is continuous and uninterrupted (that is, as opposed to a mesh).

In some embodiments, the array of interconnected surface lattice unit cells comprises a first cushioning array. The cushion further includes a first outer cushion surface and a second outer cushion surface. The first outer cushion surface has a protective cage formed thereon, and the second outer cushion surface optionally having a second cushioning array of interconnected strut lattice unit cells formed thereon.

In some embodiments, the first cushioning array of interconnected surface lattice unit cells and the second cushioning array of interconnected strut lattice unit cells are formed of the same material.

In some embodiments, a stiffness of the first cushioning array of interconnected surface lattice unit cells and the second cushioning array of interconnected strut lattice unit cells are different.

In some embodiments, the cushion has the shape of a head cushion or portion thereof (e.g., a helmet or helmet liner cushion).

In some embodiments, the cushion the shape of a seat cushion or portion thereof (e.g., a chair, bicycle or motorcycle seat cushion).

In some embodiments, a wearable protective device includes a cushion as described herein (e.g., a shin guard, knee pad, elbow pad, sports brassiere, bicycling shorts, backpack strap, backpack back, neck brace, chest protector, protective vest, protective jackets, slacks, suits, overalls, jumpsuit, and protective slacks, etc.).

In some embodiments, a bed or seat includes a cushion as described herein.

In some embodiments, an automotive or aerospace panel, bumper, or component includes a cushion as described herein.

In some embodiments, a method of making a cushion as described herein includes: (a) providing a digital model of said cushion; and then (b) producing said cushion from said digital model by an additive manufacturing process.

In some embodiments, a method for forming a cushion as described herein includes (a) forming an intermediate object by additive manufacturing (preferably by stereolithography, and most preferably by continuous liquid interface production) with a dual cure polymerizable liquid, the intermediate object having the same shape as, or a shape to be imparted to, said cushion; then (b) optionally cleaning the intermediate object; and then (c) further curing the intermediate object, optionally but preferably by heating, to produce the cushion.

In some embodiments, the dual cure resin comprises (i) a light polymerizable first component, and (ii) a second solidifiable component that is different from said first component.

In some embodiments, the second component comprises precursors to a polyurethane, polyurea, or copolymer thereof, a silicone resin, an epoxy resin, a cyanate ester resin, or a natural rubber.

In some embodiments, forming an intermediate object by additive manufacturing comprises forming an intermediate object by additive manufacturing with a three dimensional printable file format (e.g., STL format file).

DETAILED DESCRIPTION

Figure 1:
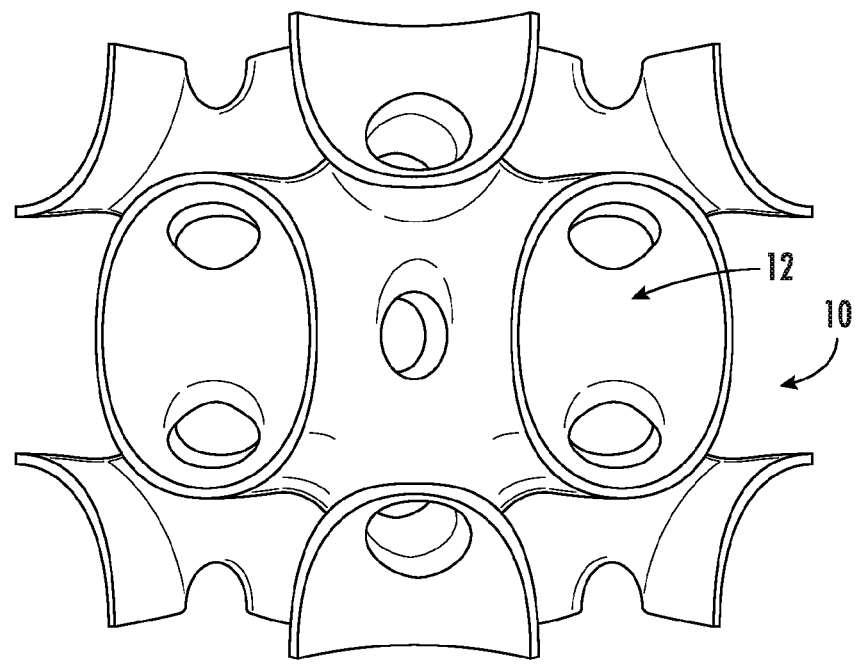
FIGS. 1-6 are perspective views of lattice unit cells according to embodiments of the present invention.
Figure 2:
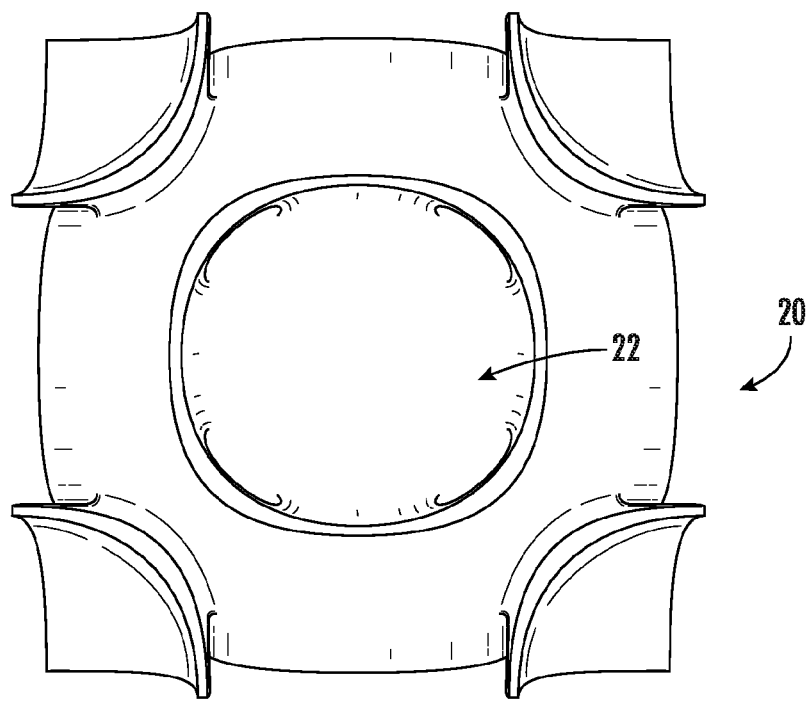
Figure 3:
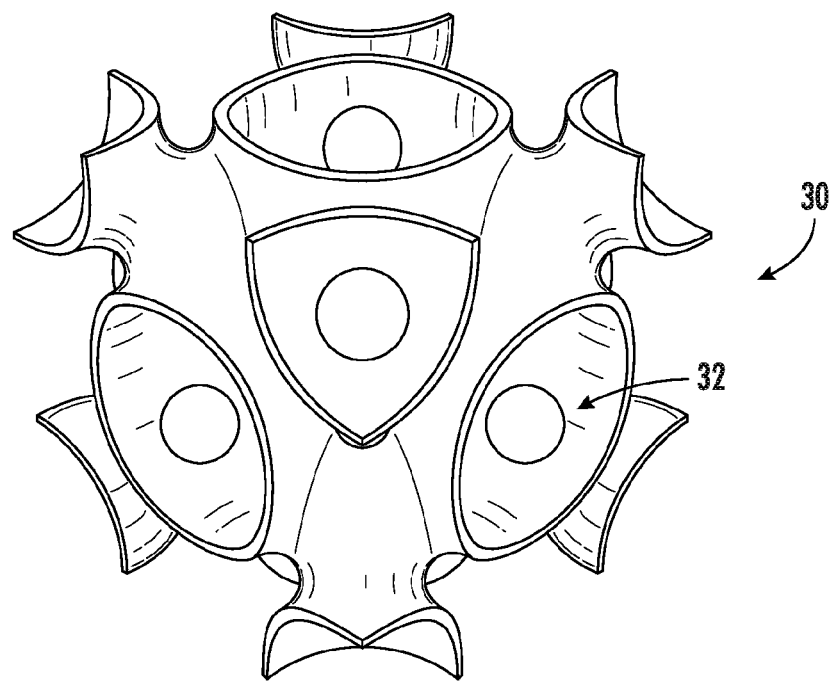
Figure 4:
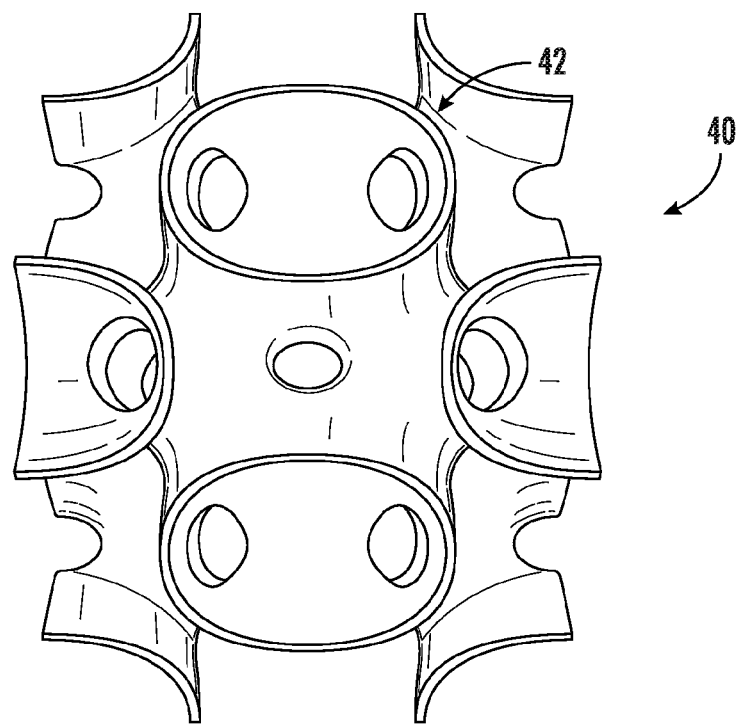
Figure 5:
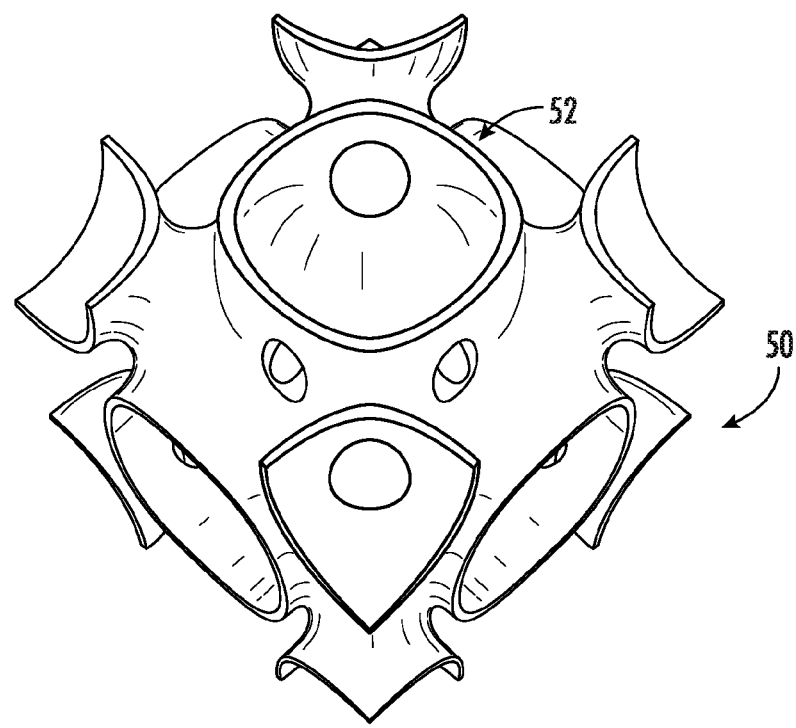
Figure 6:
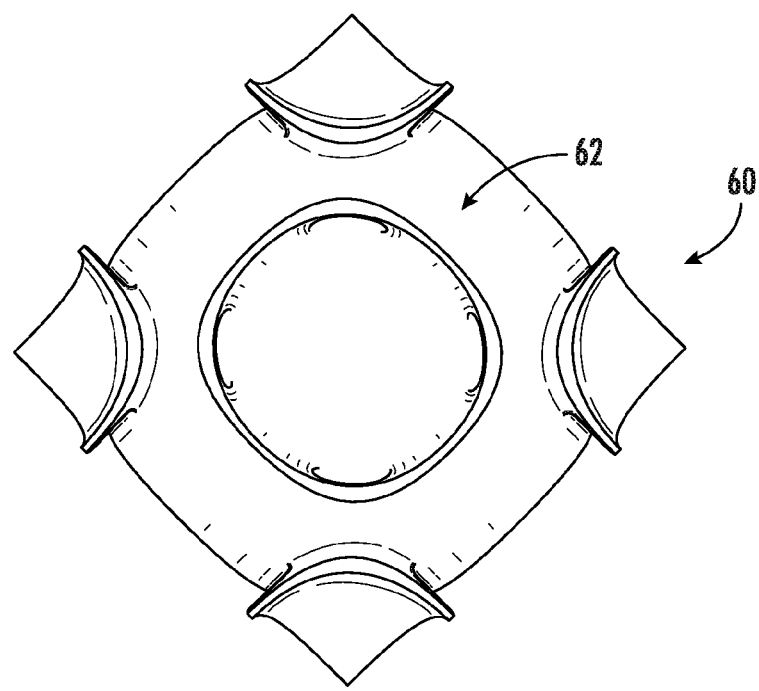

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity.

1. Additive Manufacturing Methods and Apparatus.

Additive manufacturing apparatus and methods are known. Suitable apparatus includes bottom-up apparatus that employ a window, or optically transparent member or "build plate," on which a pool of polymerizable liquid sits, and through which patterned light is projected to produce a three-dimensional object. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or the advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The particular manner of description is not critical, and the present invention can be used in any of a variety of systems that employ a semipermeable build plate, through which an inhibitor of polymerization passes, whether explicitly referred to as "CLIP" or not.

The apparatus can include a local controller that contains and executes operating instructions for the production of a three-dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., *Three-dimensional printing with reciprocal feeding of polymerizable liquid* PCT Patent Application Publication No. WO 2015/195924 (published 23 Dec. 2015); Sutter et al., *Fabrication of three dimensional objects with multiple operating modes*, PCT Patent Application Publication No. WO 2016/140886 (published 9 Sep. 2016); J. DeSimone et al., *Methods and apparatus for continuous liquid interface production with rotation*, PCT Patent Application WO 2016/007495 (published 14 Jan. 2016); see also J. DeSimone et al., U.S. Pat. No. 9,211,678, and J. Batchelder et al., *Continuous liquid interface production system with viscosity pump*, U.S. Patent Application Publication No. US 2017/0129169 (published 11 May 2017).

In one non-limiting embodiment, the apparatus may be a Carbon Inc., M1 or M2 additive manufacturing apparatus, available from Carbon, Inc., 1089 Mills Way, Redwood City, CA 94063 USA.

In some embodiments, the resin is a dual cure resin, such as a resin comprising at least one light polymerizable constituent, and at least one heat polymerizable constituent (that is a constituent different from the light polymerizable constituent). Such resins are described in, for example, Rolland et al., U.S. Pat. Nos. 9,676,963; 9,598,606; and 9,453,142, the disclosures of which are incorporated herein by reference.

Resins may be in any suitable form, including "one pot" resins and "dual precursor" resins (where cross-reactive constituents are packaged separately and mixed together before use, and which may be identified as an "A" precursor resin and a "B" precursor resin).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), or epoxy resin (EPX), all available from Carbon, Inc., 1089 Mills Way, Redwood City, California 94063 USA.

Other examples of methods and apparatus for carrying out particular embodiments of CLIP, or of additive manufacturing, such as those employing photoinhibition, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., US Patent Appub. No. US 2017/0129169 (May 11, 2017); Sun and Lichkus, US Patent App Pub. No. US 2016/0288376 (Oct. 6, 2016); Willis et al., US Patent App Pub. No. US 2015/0360419 (Dec. 17, 2015); Lin et al., US Patent App Pub. No. US 2015/0331402 (Nov. 19, 2015); and D. Castanon, US Patent App Pub. No. US 2017/0129167 (May 11, 2017), the disclosures of which are incorporated by reference herein in their entirety.

2. Example Cushions Containing Shock Absorbing Triply Periodic Lattices

In some embodiments, an additively manufactured cushion includes an array of interconnected surface lattice unit cells. The surface lattice unit cells are comprised of a unit cell surface portion configured as a Schoen F-RD minimal surface unit cell, and the unit cell surface portion is comprised of a rigid, flexible, or elastic polymer. In some embodiments, the surface lattice unit cells have an average width of from 1 to 100 millimeters and an average volume fraction of from 5 or 10 percent to 50 or 60 percent.

As illustrated in FIG. 1, a portion of a cushion having an array 10 of interconnected surface lattice unit cells 12 is shown in which the cell surface portion is configured as a Schoen F-RD minimal surface cell. Additional illustrations of arrays 20, 30, 40, 50, 60 and corresponding surface lattice unit cells 22, 32, 42, 52, 62 are shown in FIGS. 2-6.

Figure 7:
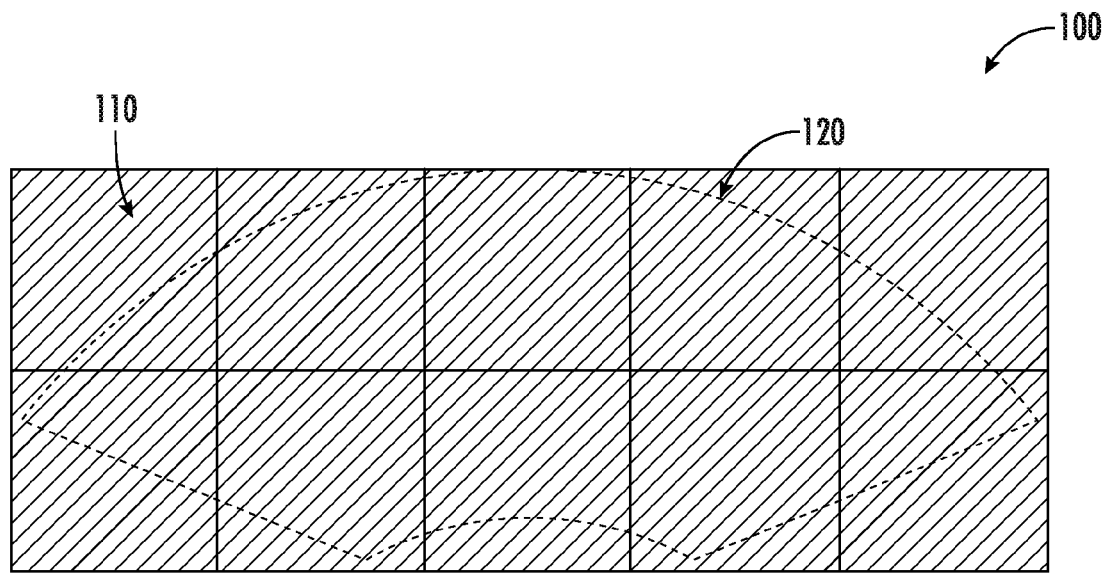
FIG. 7 is an illustration of unit cells that are cut according to a shape of a cushion according to some embodiments.
Figure 8:
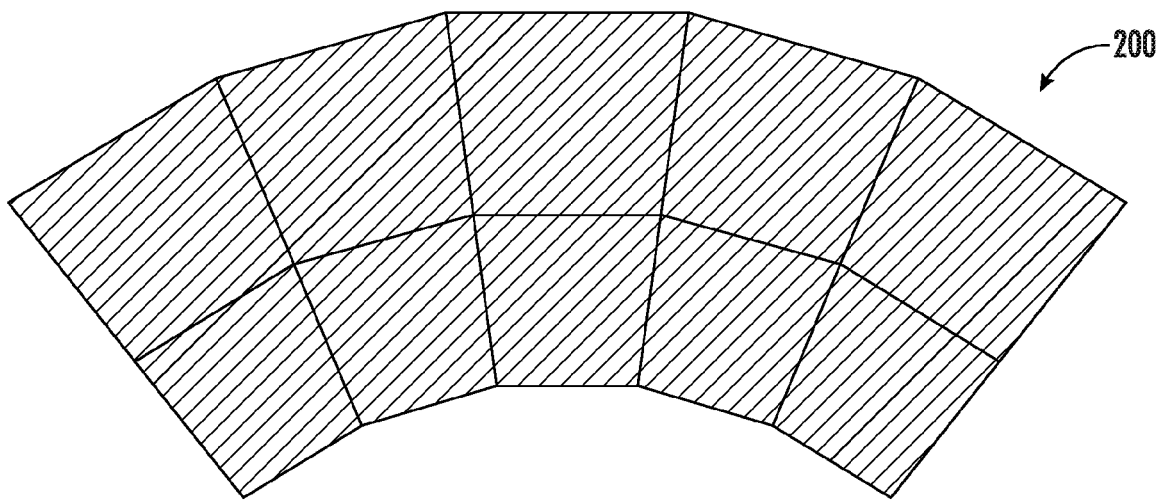
FIG. 8 is an illustration of unit cells that are conformal and frame field aligned in a shape of a cushion according to some embodiments.

In some embodiments, the cushion is formed as a curved portion, for example, to conform to an object or user to provide conformal shock absorption. As shown in the cushion 100 of FIG. 7, the unit cells 110 may be cut along line 120 to form the cushion. However, in some embodiments as shown in FIG. 8, the unit cells of the cushion 200 may be formed in a curved shape such that the curved portion of the unit cells are conformal and frame field aligned.

In some embodiments, the unit cell surface portion is continuous and uninterrupted (that is, as opposed to a mesh) as illustrated in FIGS. 1-6.

Figure 9:
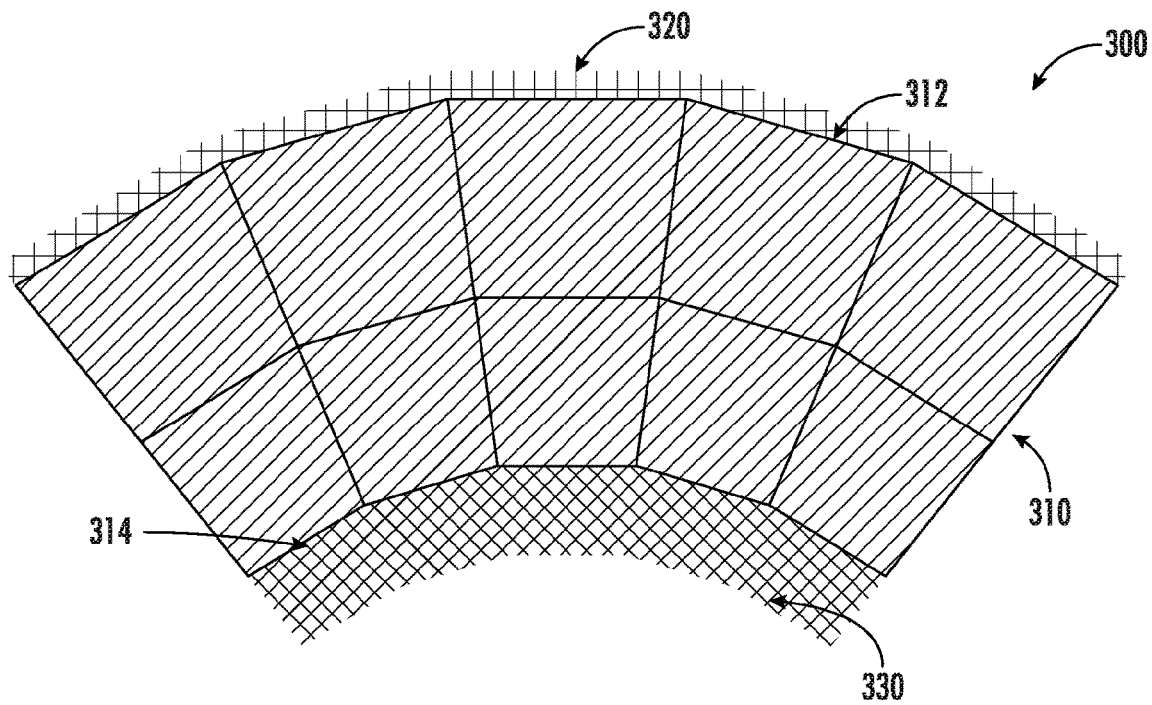
FIG. 9 is an illustration of a cushion with a second lattice structure and protective cage.

It should be understood that additional structures may be configured on the surfaces of the cushion, for example, using an additive manufacturing process. As illustrated in FIG. 9, the cushion 300 includes an array 310 of unit cells configured as a Schoen F-RD minimal surface unit cells. The array 310 can include a first outer cushion surface 312 and a second outer cushion surface 314. The first outer cushion surface 312 has a protective cage 320 formed thereon, and the second outer cushion surface 314 optionally has a second cushioning array of interconnected strut lattice unit cells 330 formed thereon. Examples of strut lattice unit cells may be found in U.S. Patent Application Publication No. 2018/0264718, the disclosure of which is incorporated herein in its entirety.

In some embodiments, the first cushioning array of interconnected surface lattice unit cells 310 and the second cushioning array of interconnected strut lattice unit cells 330 are formed of the same material. In some embodiments, the protective cage 320 may also be formed of the same material as the unit cells 310 and 320.

In some embodiments, a stiffness of the first cushioning array of interconnected surface lattice unit cells 310 and the second cushioning array of interconnected strut lattice unit cells 330 are different. For example, the surface lattice unit cells 310 may be stiffer than the strut lattice cells 330 such that the strut lattice cells 330 may face the user to provide additional comfort. The protective cage 320 may be stiffer than either the strut lattice cells 330 or the surface lattice unit cells 310 to provide additional structural strength. The protective cage 320 may be provided for ease of manufacturing. For example, the protective cage 320 may be a generally continuous boarder that provides robust manufacturability to the unit cells 310, which may otherwise by potentially difficult to produce by three dimensional (3D) printing at a boundary. The protective cage 320 may fully surround the strut lattice cells 330 on one or more sides thereof, and may form a solid, unitary boarder: however, in some embodiments, the protective cage 320 may have an open cell structure or apertures that provides a smooth flat or curved surface at the edges of the cells. The outer surface of the protective cage 320 may be smooth and/or have surface characteristics for comfort if the protective cage 320 is used as a skin-facing, outer surface, for example, when used as a helmet or other device that contacts a wearer. In addition, a protective cage may provide case of use for cleaning and/or increased comfort because the protective cage may reduce or avoid sharp edges of the lattice from facing the user or wearer.

Figure 10:
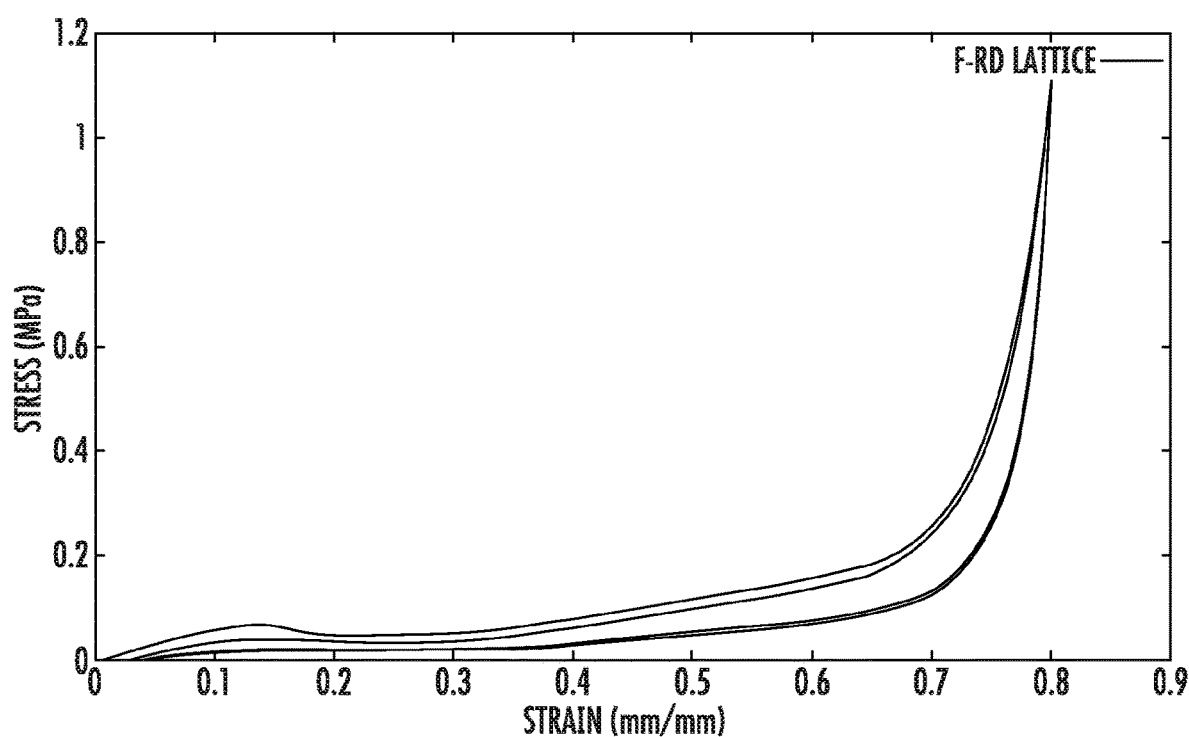
FIG. 10 is a graph of stress strain curves for an F-RD

In some embodiments, favorable stress-strain curves may be obtained, such as shown in FIG. 10, which illustrates a stress-strain curve performed for a cell size of 20 mm×20 mm×20 mm using an additively manufactured cell using an EPU 40 resin.

Figure 11A:
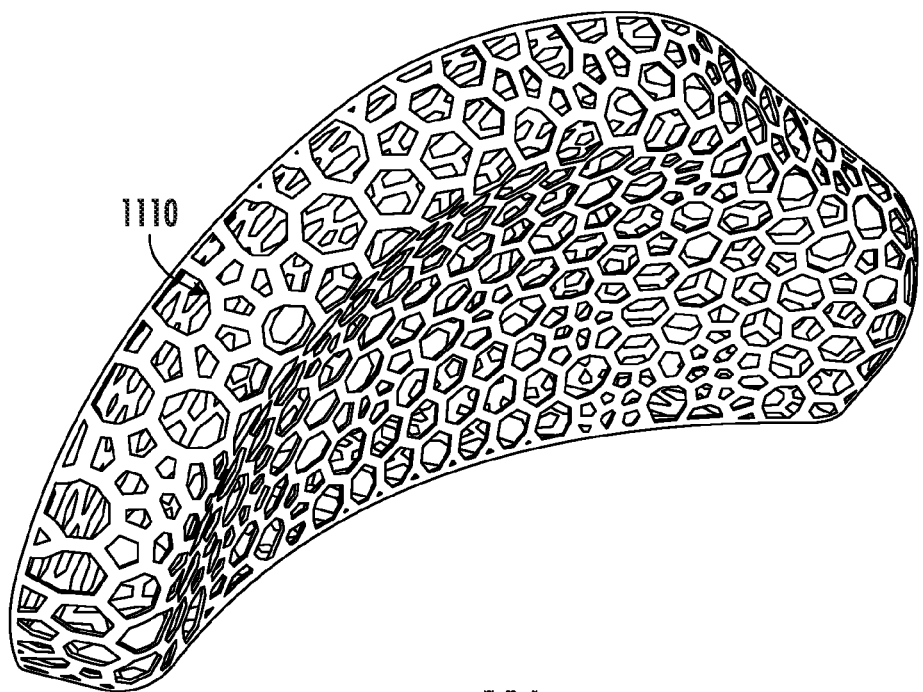
FIG. 11A is a perspective view of an empty protective cage for a cushion according to some embodiments.
Figure 11B:
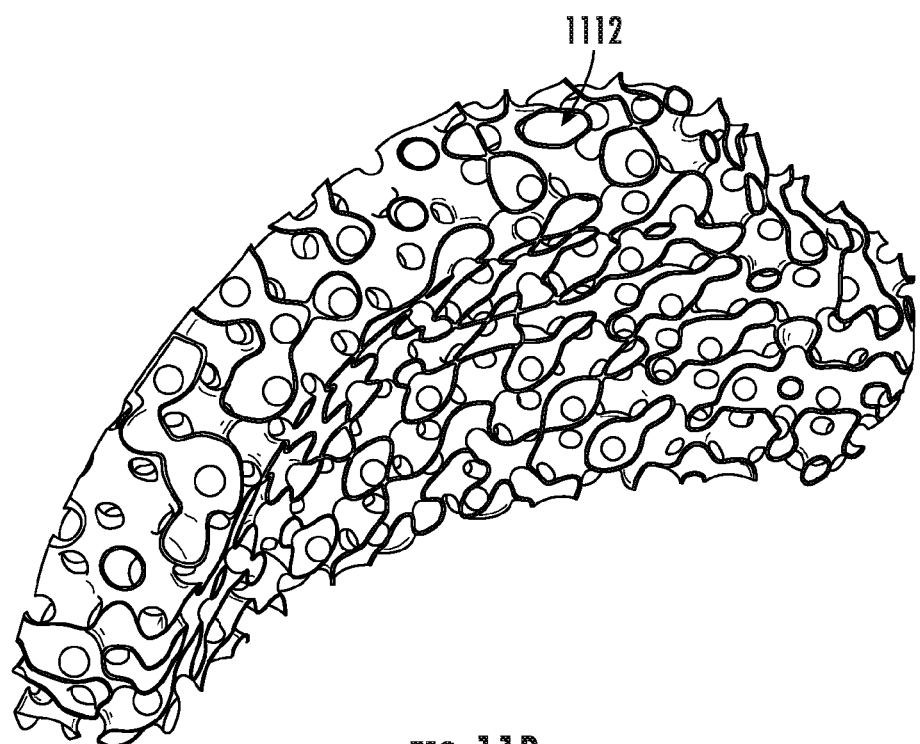
FIG. 11B is a nonconformal F-RD lattice cushion according to some embodiments.
Figure 11C:
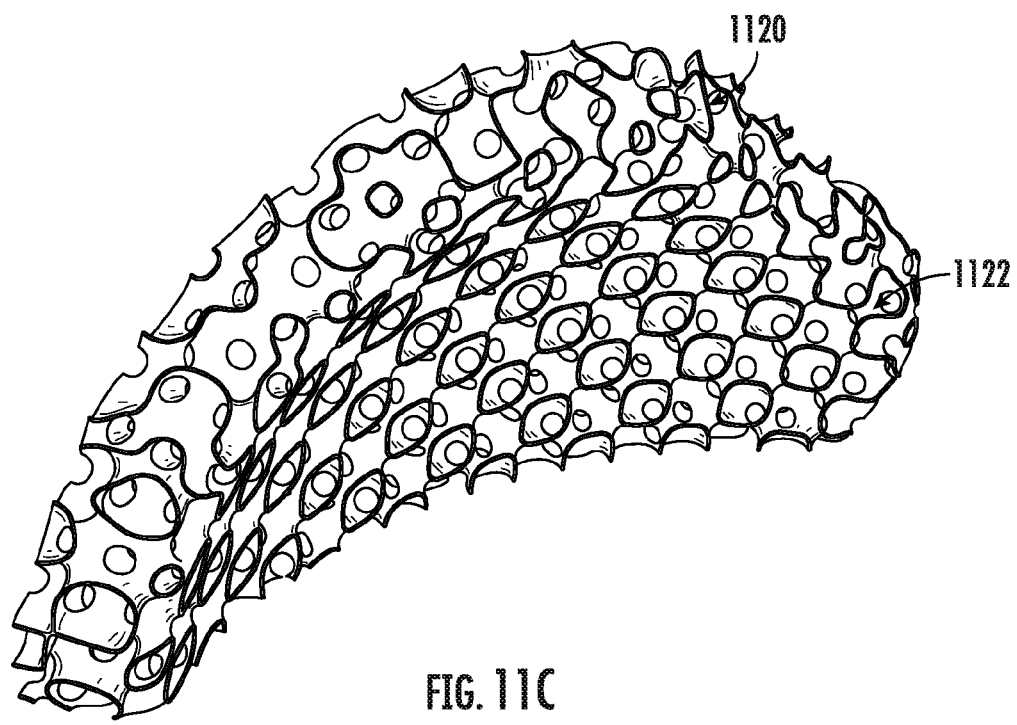
FIG. 11C is a conformal F-RD lattice cushion according to some embodiments.
Figure 11D:
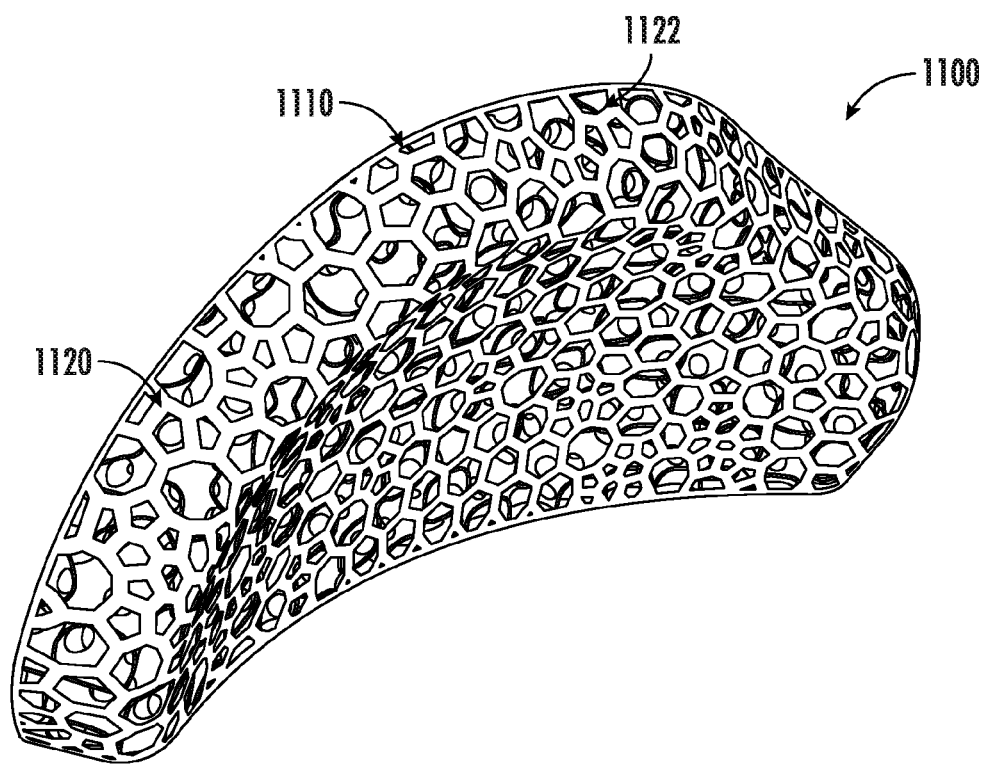
FIG. 11D is a F-RD lattice and protective cage assembly according to some embodiments.

As shown in FIG. 11A, an empty protective cage 1110 is shown. FIG. 11B illustrates a non-conformal F-RD lattice 1112 for a helmet cushion that may be positioned in a protective cage, such as the protective cage 1110 of FIG. 11A. FIG. 11C is an image of a conformal F-RD lattice 1120 in which the lattice cells 1122 are curved to conform to the shape of the cushion. FIG. 11D is an image of the assembled cushion 1100, which includes the protective cage 1110 enclosing the conformal F-RD lattice 1120 with cells 1122. FIGS. 11A and 11D show a smooth, open cell, protective cage 1120 that provides a reinforcing surface to the exterior of the cushion 1100. In some embodiments, the cushion 1100 may form a portion of a helmet or helmet liner cushion. It should be understood that the cushion may be configured in various shapes as described here.

In some embodiments, the cushion has the shape of a head cushion or portion thereof (e.g., a helmet or helmet liner cushion).

In some embodiments, the cushion the shape of a seat cushion or portion thereof (e.g. a chair, bicycle or motorcycle seat cushion).

In some embodiments, a wearable protective device includes a cushion as described herein (e.g., a shin guard, knee pad, elbow pad, sports brassiere, bicycling shorts, backpack strap, backpack back, neck brace, chest protector, protective vest, protective jackets, slacks, suits, overalls, jumpsuit, and protective slacks, etc.).

In some embodiments, a bed or seat includes a cushion as described herein.

In some embodiments, an automotive or aerospace panel, bumper, or component includes a cushion as described herein.

Figure 12:
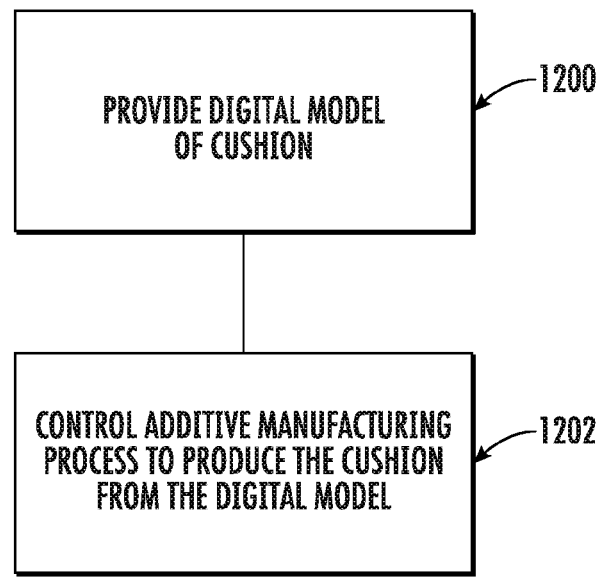
FIG. 12 is a flowchart of operations according to some embodiments.

In some embodiments, a method of making a cushion as described herein includes: (a) providing a digital model of a cushion; and then (b) producing said cushion from said digital model by an additive manufacturing process. As shown in FIG. 12, a digital model of a cushion can be provided, such as in a printable file format (e.g., an STL file) (Block 1200). The digital model can incorporate features of the cushions and lattice structures described herein. An additive manufacturing process may be controlled to produce the cushion from the digital model, e.g., using control software to control a three-dimensional printer to print the digital model of the cushion (Block 1202).

In some embodiments, a method for forming a cushion as described herein includes (a) forming an intermediate object by additive manufacturing (preferably by stereolithography, and most preferably by continuous liquid interface production) with a dual cure polymerizable liquid, the intermediate object having the same shape as, or a shape to be imparted to, said cushion; then (b) optionally cleaning the intermediate object; and then (c) further curing the intermediate object, optionally but preferably by heating, to produce the cushion.

Cleaning may be by washing, draining, spinning or centrifugal cleaning, blowing, etc., including combinations thereof.

In some embodiments, the dual cure resin comprises (i) a light polymerizable first component, and (ii) a second solidifiable component that is different from said first component.

In some embodiments, the second component comprises precursors to a polyurethane, polyurea, or copolymer thereof, a silicone resin, an epoxy resin, a cyanate ester resin, or a natural rubber.

In some embodiments, the resin is EPU 40 resin.

In some embodiments, forming an intermediate object by additive manufacturing comprises forming an intermediate object by additive manufacturing with a three dimensional printable file format (e.g., STL format file).

Figure 13:
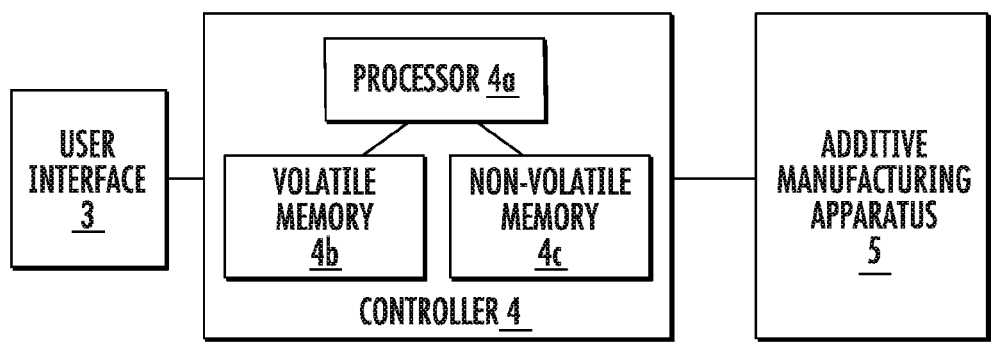
FIG. 13 is a schematic diagram of methods and systems according to some embodiments.

Methods and apparatus for carrying out the present invention, including forming lattice structures as described herein, are schematically illustrated in FIG. 13. Such an apparatus includes a user interface 3 for inputting instructions (such as selection of an object to be produced, and selection of features to be added to the object), a controller 4, and a stereolithography apparatus 5 such as described herein. An optional washer can be included in the system if desired, or a separate washer can be utilized. Similarly, for dual cure resins, an oven can be included in the system, although a separately-operated oven can also be utilized.

Connections between components of the system can be by any suitable configuration, including wired and/or wireless connections. The components may also communicate over one or more networks, including any conventional, public and/or private, real and/or virtual, wired and/or wireless network, including the Internet.

The controller 4 may be of any suitable type, such as a general-purpose computer and may be configured for controlling the additive manufacturing apparatus 5, for example, using printable file format files (e.g., STL files) as instructions for forming a given object. Typically the controller 4 will include at least one processor 4*a*, a volatile (or "working") memory 4*b*, such as random-access memory, and at least one non-volatile or persistent memory 4*c*, such as a hard drive or a flash drive. The controller 4 may use hardware, software implemented with hardware, firmware, tangible computer-readable storage media having instructions stored thereon, and/or a combination thereof, and may be implemented in one or more computer systems or other processing systems. The controller 4 may also utilize a virtual instance of a computer. As such, the devices and methods described herein may be embodied in any combination of hardware and software that may all generally be referred to herein as a "circuit," "module," "component," and/or "system." Furthermore, aspects of the present invention may take the form of a computer program product embodied in one or more computer readable media having computer readable program code embodied thereon.

It will be understood that various implementations of the methods and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, steps, operations, elements components and/or groups or combinations thereof, but do not preclude the presence or addition of one or more other features, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the Figures may be schematic in nature and their shapes are not intended to illustrate the actual shape of a region of a device and are not intended to limit the scope of the inventive subject matter.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An additively manufactured cushion comprising:
   an array of interconnected surface lattice unit cells, said surface lattice unit cells comprised of a unit cell surface portion configured as a Schoen F-RD minimal surface unit cell, with said unit cell surface portion comprised of a rigid, flexible, or elastic polymer; and
   said surface lattice unit cells having an average width of from 1 to 100 millimeters and an average volume fraction of from 5 or 10 percent to 50 or 60 percent.

2. The cushion of claim 1, wherein said cushion comprises a curved portion, and wherein said unit cells in said curved portion are conformal and frame field aligned.

3. The cushion of claim 1, wherein said unit cell surface portion is continuous and uninterrupted.

4. The cushion of claim 1, wherein said array of interconnected surface lattice unit cells comprises a first cushioning array, said cushion further comprising a first outer cushion surface and a second outer cushion surface, said first outer cushion surface having a protective cage formed thereon, and said second outer cushion surface optionally having a second cushioning array of interconnected strut lattice unit cells formed thereon.

5. The cushion of claim 4, wherein said first cushioning array of interconnected surface lattice unit cells and said second cushioning array of interconnected strut lattice unit cells are formed of the same material.

6. The cushion of claim 4, wherein a stiffness of said first cushioning array of interconnected surface lattice unit cells and said second cushioning array of interconnected strut lattice unit cells are different.

7. The cushion of claim 1, said cushion having a shape of a head cushion or portion thereof.

8. The cushion of claim 1, said cushion having a shape of a seat cushion or portion thereof.

9. The cushion of claim 1, wherein said array of interconnected surface lattice unit cells comprises a first cushioning array, said cushion further comprising a first outer cushion surface and a second outer cushion surface, said first outer cushion surface having a protective cage formed thereon, and said second outer cushion surface optionally having a second cushioning array of interconnected strut lattice unit cells formed thereon, wherein said first cushioning array of interconnected surface lattice unit cells and said second cushioning array of interconnected strut lattice unit cells are formed of the same material, said cushion having a shape of a head cushion or portion thereof.

10. A wearable protective device comprising a cushion of claim 1.

11. A bed or seat comprising a cushion of claim 1.

12. An automotive or aerospace panel, bumper, or component comprising a cushion of claim 1.

13. A method of making a cushion of claim 1, comprising:
   (a) providing a digital model of said cushion; and then
   (b) producing said cushion from said digital model by an additive manufacturing process.

14. A method for forming a cushion of claim 1, comprising:
   (a) forming an intermediate object by additive manufacturing with a dual cure polymerizable liquid, said intermediate object having the same shape as, or a shape to be imparted to, said cushion; then
   (b) optionally cleaning said intermediate object; and then
   (c) further curing said intermediate object, optionally by heating, to produce said cushion.

15. The method of claim 14, wherein said dual cure resin comprises (i) a light polymerizable first component, and (ii) a second solidifiable component that is different from said first component.

16. The method of claim 15, wherein: said second component comprises precursors to a polyurethane, polyurea, or copolymer thereof, a silicone resin, an epoxy resin, a cyanate ester resin, or a natural rubber.

17. The method of claim 16, wherein forming an intermediate object by additive manufacturing comprises forming an intermediate object by additive manufacturing with a three dimensional printable file format.

\* \* \* \* \*